United States Patent
Hsu et al.

(10) Patent No.: US 8,525,969 B2
(45) Date of Patent: Sep. 3, 2013

(54) REPAIR STRUCTURE FOR LIQUID CRYSTAL DISPLAY PANEL AND REPAIRING METHOD THEREOF

(75) Inventors: Rong-chang Hsu, Taiping (TW); Bo-sin Lin, Xizhi (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 346 days.

(21) Appl. No.: 13/014,594

(22) Filed: Jan. 26, 2011

(65) Prior Publication Data

US 2012/0050662 A1    Mar. 1, 2012

(30) Foreign Application Priority Data

Aug. 27, 2010 (TW) ................................ 99128894 A

(51) Int. Cl.
  *G02F 1/13* (2006.01)
  *G02F 1/1333* (2006.01)
  *G02F 1/1343* (2006.01)

(52) U.S. Cl.
  USPC ............................................ 349/192; 349/55

(58) Field of Classification Search
  USPC ................................................ 349/54, 55, 192
  See application file for complete search history.

(56) References Cited

U.S. PATENT DOCUMENTS

| | | | |
|---|---|---|---|
| 6,614,494 | B2 | 9/2003 | Kawai et al. |
| 6,628,368 | B2 * | 9/2003 | Yang .............................. 349/192 |
| 6,788,356 | B2 * | 9/2004 | Song ................................ 349/43 |
| 6,989,884 | B2 * | 1/2006 | Te-Cheng ...................... 349/192 |
| 8,379,185 | B2 * | 2/2013 | Chang et al. ................... 349/192 |
| 2005/0117104 | A1 * | 6/2005 | Nishida et al. ................. 349/141 |
| 2005/0122460 | A1 * | 6/2005 | Yokogawa et al. ............ 349/141 |
| 2009/0290086 | A1 * | 11/2009 | Chang et al. ..................... 349/55 |

FOREIGN PATENT DOCUMENTS

| | | |
|---|---|---|
| CN | 101174067 A | 5/2008 |
| TW | 200712713 | 4/2007 |
| TW | I297545 | 6/2008 |
| TW | I315798 | 10/2009 |
| TW | 201009433 | 3/2010 |

\* cited by examiner

*Primary Examiner* — Edward Glick
*Assistant Examiner* — Dennis Y Kim
(74) *Attorney, Agent, or Firm* — Cheng-Ju Chiang

(57) ABSTRACT

A repair structure for a liquid crystal display (LCD) panel and a repairing method thereof are disclosed. The LCD panel includes a plurality of common lines being parallel to a plurality of scan lines, and the common lines and the scan lines are alternately disposed on a substrate. Each of the common lines has a plurality of branches and gaps. The branches are parallel to a plurality of signal lines, and the gaps are defined between a trunk of the common lines and the branches. The branches overlap without contacting the signal lines. Each branch, the corresponding signal line and the pixel electrode are arranged so as to expose the corresponding gap. The gap is utilized for providing an external tool to cut off the common line to be disconnected from the branch.

10 Claims, 7 Drawing Sheets

REPAIR STRUCTURE FOR LIQUID CRYSTAL DISPLAY PANEL AND REPAIRING METHOD THEREOF

TECHNICAL FIELD OF THE INVENTION

The present invention relates to a repair structure for a liquid crystal display (LCD), and especially to a repair structure and a repairing method for an LCD panel with a high aperture ratio.

BACKGROUND OF THE INVENTION

Liquid crystal display (LCD) has the advantages of low radiation and compact size; thus, the LCD is now being widely used and becoming a mainstream display.

Because the liquid crystals do not radiate light, the liquid crystal display needs to utilize a backlight module to serve as a light source. Because light of the light source penetrates the respective layers of the LCD, such as polarizers, color filters, etc., in actuality, the brightness that is really shown is only about ten percent of the original light source brightness. To overcome the problem of inadequate displayed brightness, if the backlight brightness is raised, the brightness of the display panel can be accordingly raised. However, the power consumption of the backlight module is also increased. Therefore, a conventional technique has been proposed to increase the aperture ratio of the pixels on the display panel so as to improve the brightness of the panel.

Taiwan Patent Publication Number 200712713 (Publication Date: Apr. 1, 2007) reveals, in order to obtain a higher aperture ratio, an active device array substrate in which common electrodes serve as storage capacitors (Cs) is arranged below signal lines so as to increase the aperture ratio of the pixels. Referring to FIG. 1, a top view schematically illustrates a high-aperture-ratio pixel design in the conventional art, thereby explaining the pixel structures 100 having common electrodes which are disposed below the signal lines. The pixel structure has a plurality of signal lines 102 and a plurality of scan lines 104 which are perpendicular to the signal lines 102. A thin film transistor, (TFT) 110 is electrically coupled to each signal line 102 and each scan line 104 to serve as a switch. A drain terminal 116 of the TFT 110 is electrically coupled to a transparent pixel electrode 106 through a contact hole 117. A storage capacitor electrode 120 is disposed below the signal lines 102 and the drain terminals 116 to increase the aperture ratio of the pixel structures 100. In addition, there is an isolation layer (not shown) which is disposed between the storage capacitor electrode 120 and the signal lines 102 as well as the drain terminals 116.

This design increases the aperture ratio, however, if there are some defects formed in the production process, a short-circuit or an open-circuit may occur in the storage capacitor electrode 120 and the signal lines 102 and results in an image defect. Referring to FIG. 2, FIG. 2 is a schematic drawing illustrating a repair on the pixel structure of the prior art. Conventionally, when a short-circuit (as shown by a circle in FIG. 2) occurs between the storage capacitor electrode 120 and one of the signal line 102, the storage capacitor electrode 120 shared by the two adjacent pixel structures 100 should be disconnected by a laser cutting (as shown by dashed lines) to solve this problem. However, the repair via the laser cutting herein may cause the pixel electrodes 106 to be shorted with the storage capacitor electrode 120, resulting in a risk that the two adjacent pixel structure 100 become bad spots.

In addition, when an open-circuit occurs between the storage capacitor electrode 120 and the signal line 102 (as shown by an X in FIG. 2), the storage capacitor electrodes 120 shared by the two adjacent pixel structures 100 should be disconnected by a laser cutting (as shown by dashed lines), and the storage capacitor electrode 120 and the signal line 102 are welded as a short-circuit (as shown by ellipses in FIG. 2). However, there is also a risk of the pixel electrodes 106 to be shorted with the storage capacitor electrode 120.

Thus, the pixel structures whereby the common electrodes are arranged below the signal lines can not utilizing the laser cutting to repair the storage capacitor electrode. Accordingly, the display panel can only be scrapped, resulting in a waste in production cost.

SUMMARY OF THE INVENTION

Accordingly, an objective of the present invention is to provide a repair structure for a high-aperture-ratio LCD panel to overcome the drawbacks of the above-mentioned prior art.

Another objective of the present invention is to provide a repairing method for the repair structure of the high-aperture-ratio LCD panel. The pixel structures of the present invention LCD panel can be repaired via a laser cutting, instead of simply discarding the LCD panel.

To achieve the foregoing objectives, according to an aspect of the present invention, a repair structure for a liquid crystal display panel is provided, which includes a substrate, a plurality of scan lines, a plurality of signal lines, a plurality of thin film transistors (TFTs) and a plurality of common lines. The scan lines are disposed on the substrate. The signal lines cross and do not contact the scan lines to define a plurality of pixel regions. The TFTs are respectively disposed in the pixel regions, and each of the TFTs is electrically coupled to a corresponding one of the scan lines and a corresponding one of the signal lines. The pixel electrodes are respectively disposed in the pixel regions, and each pixel electrode is electrically coupled to a corresponding one of the TFTs.

In addition, the common lines are parallel to and alternately disposed with the scan lines on the substrate. Each of the common lines has a plurality of branches, which are parallel to the signal lines, and a plurality of gaps, which are defined between a trunk of the common line and the branches. The branches of each common line respectively overlap and do not contact the signal lines. Each branch, the corresponding signal line, and the pixel electrode are arranged so as to expose the corresponding gap. According to the afore-mentioned arrangement, the common line can be cut off from the gap via an external tool, thereby disconnecting the common line from the branch.

In one preferred embodiment of the present invention, each of the TFTs has a drain electrode. One end of the drain electrode is electrically coupled to the TFT and the other end is disposed on the common line and electrically coupled to the corresponding pixel electrode via a contact hole. In another preferred embodiment of the present invention, the other end of the drain electrode has an extension portion for covering a part of the gap.

In one preferred embodiment of the present invention, the drain electrode and the signal line are made of a same metal material, and the common line and the scan line are made of a same metal material. In addition, the branches are respectively disposed below the signal lines.

According to another aspect of the present invention, a repairing method for the repair structure of the LCD panel in the preferred embodiments is provided. When a damaged signal line is shorted with the corresponding branch, the method comprises a cutting process and a welding process.

The cutting process is cutting the corresponding common line respectively from a first gap and a second gap which are adjacent to the corresponding branch, wherein the first gap corresponds to the damaged signal line, and the first gap and the second gap are defined at both sides of the damaged signal line. The welding process is welding the TFT which corresponds to the second gap onto the scan line. In one preferred embodiment, the cutting process utilizes a laser to cut, and the welding process utilizes a laser to weld.

In another preferred embodiment of the present invention, a repairing method for the repair structure of the LCD panel is provided. When a damaged signal line is an open-circuit, the method comprises a cutting process and a welding process as follows.

The cutting process is cutting the corresponding common line from a first gap and a second gap which are adjacent to the branch corresponding to the damaged signal line, wherein the first gap corresponds to the damaged signal line, and the first gap and the second gap are defined at both sides of the damaged signal line. The welding process is welding two terminals of a broken spot of the damaged signal line onto the branch respectively, and welding the TFT which corresponds to the second gap onto the scan line. In the preferred embodiment, the cutting process utilizes a laser to cut, and the welding process utilizes a laser to weld.

In accordance with the repair structure and the repairing method of the present invention, the drawback of the high-aperture-ratio pixel structures in the conventional art which can not be repaired has been solved via the design of the gaps, and the cost discarding defective products will also be reduced.

It is to be understood that both the foregoing general description and the following detailed description of the present invention are exemplary and explanatory and are intended to provide further explanation of the invention as claimed.

DETAILED DESCRIPTION OF THE INVENTION

Figure 1:
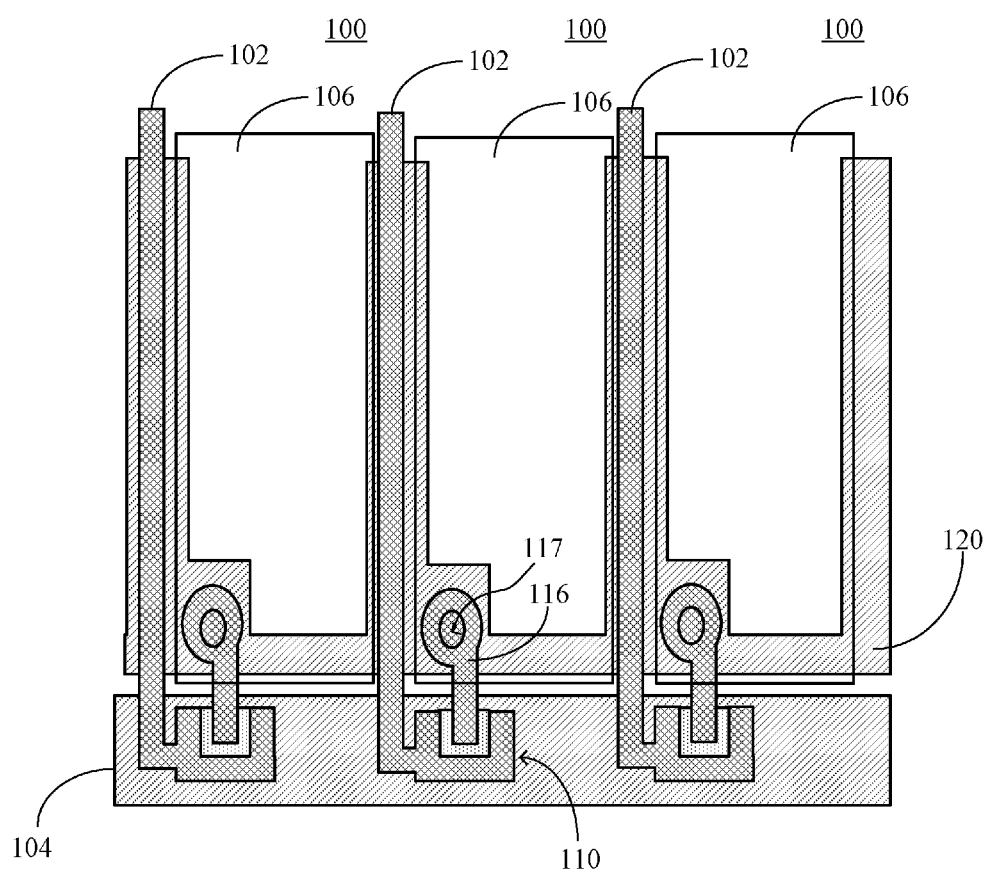
FIG. 1 is a top view schematically illustrating a high-aperture-ratio pixel design in the conventional art.
Figure 2:
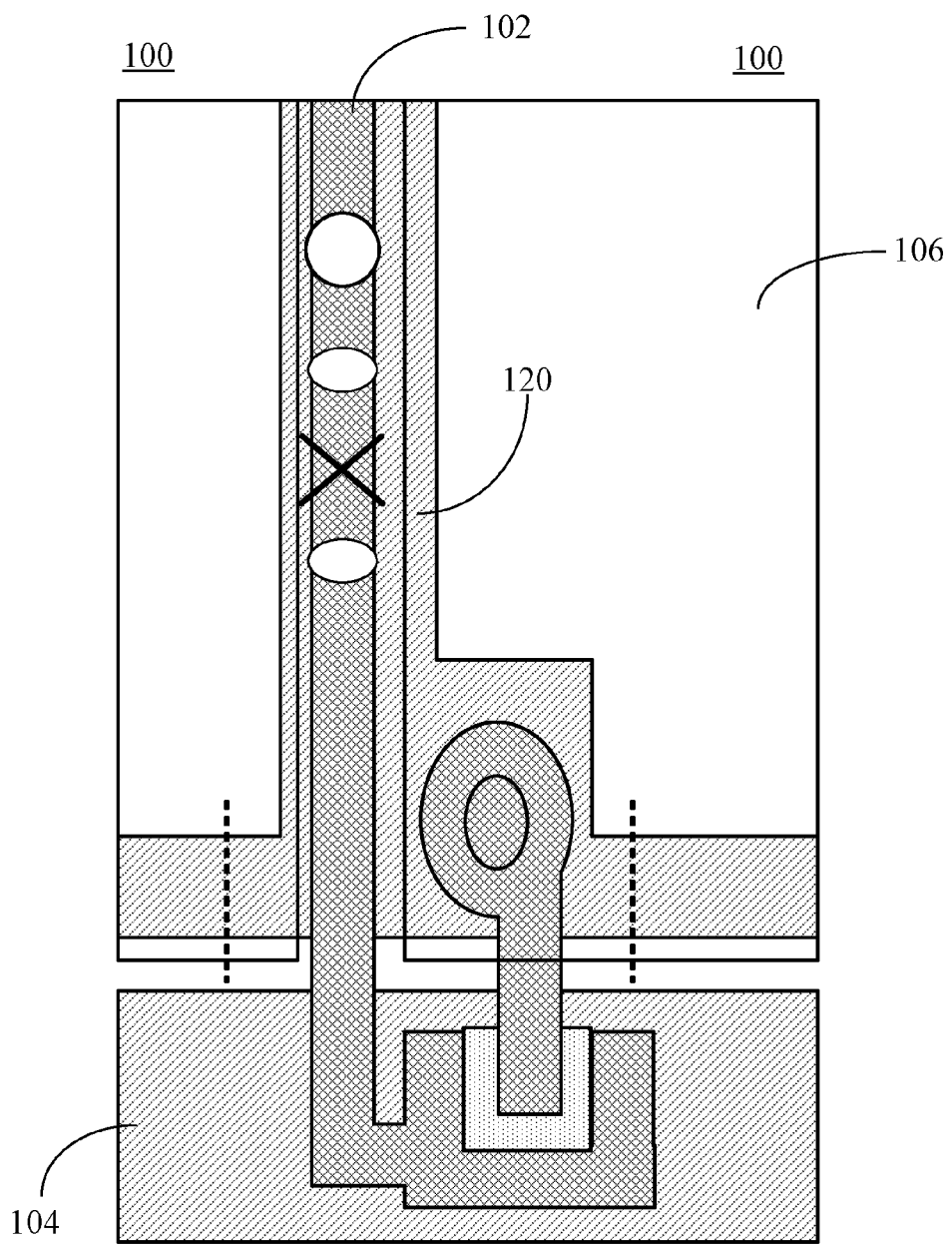
FIG. 2 is a schematic drawing illustrating a repair of the pixel structure in the conventional art.
Figure 3:
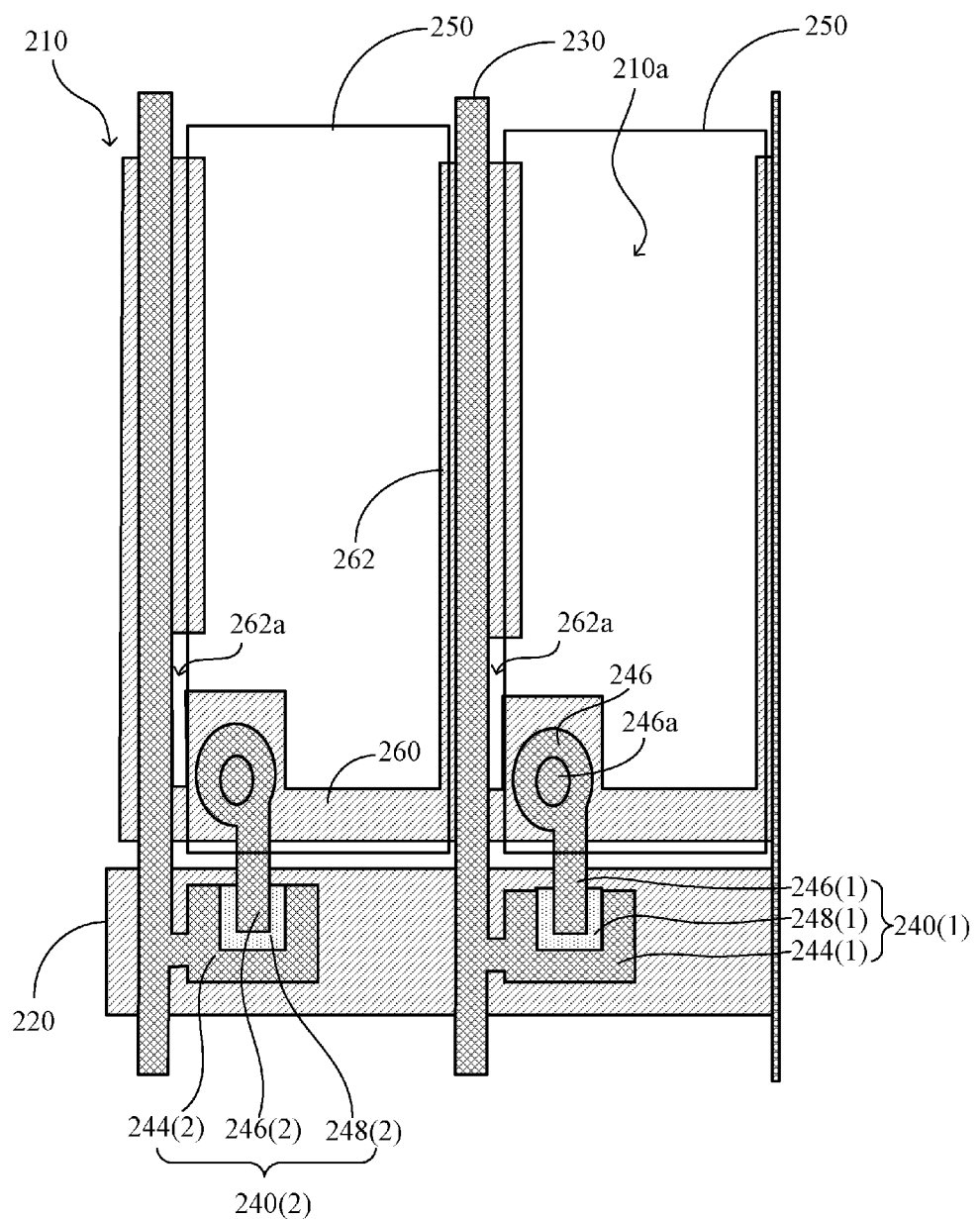
FIG. 3 is a top view schematically illustrating a repair structure of an LCD panel in one preferred embodiment of the present invention.

The present invention will now be described in detail with reference to a few preferred embodiments thereof as illustrated in the accompanying drawings. The same reference numerals refer to the same parts or like parts throughout the various Figures. FIG. 3 is a top view schematically illustrating a repair structure of an LCD panel in one preferred embodiment of the present invention. Referring to FIG. 3, the repair structure of the LCD panel 200 in the preferred embodiment can be illustrated by two adjacent pixel structures. The repair structure of the LCD panel 200 includes a substrate 210, a plurality of scan lines 220, a plurality of signal lines 230, a plurality of thin film transistors (TFTs), a plurality of pixel electrodes 250 and a plurality of common lines 260.

The scan lines 220 are disposed on the substrate 210 in a parallel manner, and the signal lines 230 cross and do not contact the scan lines 220 to define a plurality of pixel regions 210a. The signal lines 230 are separated from the scan lines 220. Moreover, the pixel regions 210a are arranged in an array. In the preferred embodiment, the substrate 210 is a glass substrate, a quartz substrate, or other transparent substrate. In addition, there is an isolation layer (not shown for clarity) disposed between the signal lines 230 and the scan lines 220 for separating from each other.

The TFTs 240 (designated as 240 (1) and 240 (2)) are respectively disposed in the pixel regions 210a, and each of the TFTs 240 is electrically coupled to the corresponding scan line 220 and the corresponding signal line 230. In the preferred embodiment, the TFTs 240 are respectively disposed on the corresponding scan lines 220. The pixel electrodes 250 are respectively disposed in the pixel regions 210a, and each pixel electrode 250 is electrically coupled to the corresponding TFT 240. In addition, the pixel electrode 250 is made of indium tin oxide (ITO), indium zinc oxide (IZO), aluminum zinc oxide (AZO) or other transparent conductor materials.

The common lines 260 and the scan lines 220 are parallel and alternately disposed on the substrate 210. Further, each of the common lines 260 is located in the pixel regions 210a which are arranged in a row, as well as crosses the signal lines 230, and each does not contact the other. Similarly, there is an isolation layer (not shown) disposed between the common lines 260 and the signal lines 230 for separating from each other.

Each TFT 240 has a source electrode 244, a drain electrode 246 and a semiconductors layer 248. One end of the drain electrode 246 is electrically coupled to the source electrode 244, that is, electrically coupled to the source electrode 244 via the semiconductor layer 248. In addition, the other end of the drain electrode 246 is disposed on the common line 260 and electrically coupled to the corresponding pixel electrode 250 via a contact hole 246a.

In the preferred embodiment, each of the common lines 260 has a plurality of branches 262, which are parallel to the signal lines 230, and a plurality of gaps, which are defined between a trunk of the common line 260 and the branches 262. The branches 262 of each common line respectively overlap and do not contact the signal lines 230. Specifically, the branches 262 are respectively disposed below the signal lines 230, and there is an isolation layer (not shown) disposed between the branches 262 and the signal lines 230 for separating one from contacting the other. Moreover, in order for the pixel electrodes 250 to show gray scales according to data signals without the scan lines 220 driving the TFTs 240, storage capacitors are formed from the overlaps between the pixel electrodes 250 and parts of the common lines 260 and the branches 262 for storing the data signals.

Figure 5:
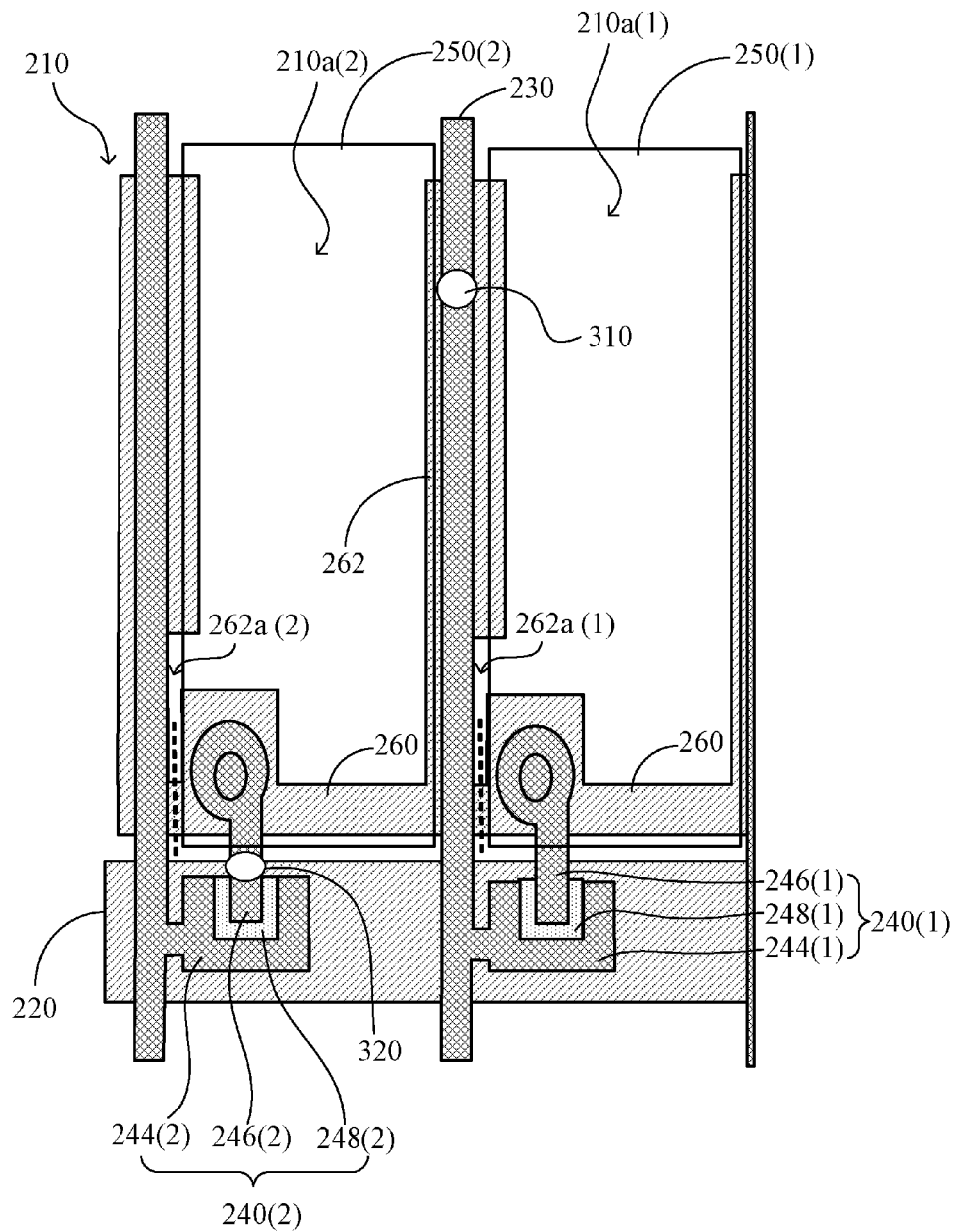
FIG. 5 is a schematic drawing illustrating the repairing method according to one preferred embodiment of the present invention.

On the other hand, each branch 262, the corresponding signal line 230, and the pixel electrode 250 are arranged so as to expose the corresponding gap 262a as shown in FIG. 3. The common line 260 can be cut off along the dotted lines (as shown in FIG. 5) via an external tool from the gap 262a, thereby disconnecting the common line 260 and the branches 262. The common line 260 at the dotted lines does not overlap the pixel electrodes 250, so an electrical interference caused by a short circuit between the pixel electrode 250 and the common line 260 after cutting can be prevented.

It should be noted that the common lines 260, the branches 262 and the scan lines 220 are formed in a first mask process; thus, they are made of a same metal material. Moreover, the source lines 244, the drain electrodes 246 and the signal lines 230 are formed in a second mask process; thus, they are made of a same metal material. In addition, the shape of the gap 262a is not limited to be a rectangular shape. The shape of the gap 262a can be designed via the first and second mask processes as desired, without an additional formation of the gap 262a. It should also be noted that the gap 262a has the above-mentioned isolation layer and is not an empty structure.

Figure 4A:
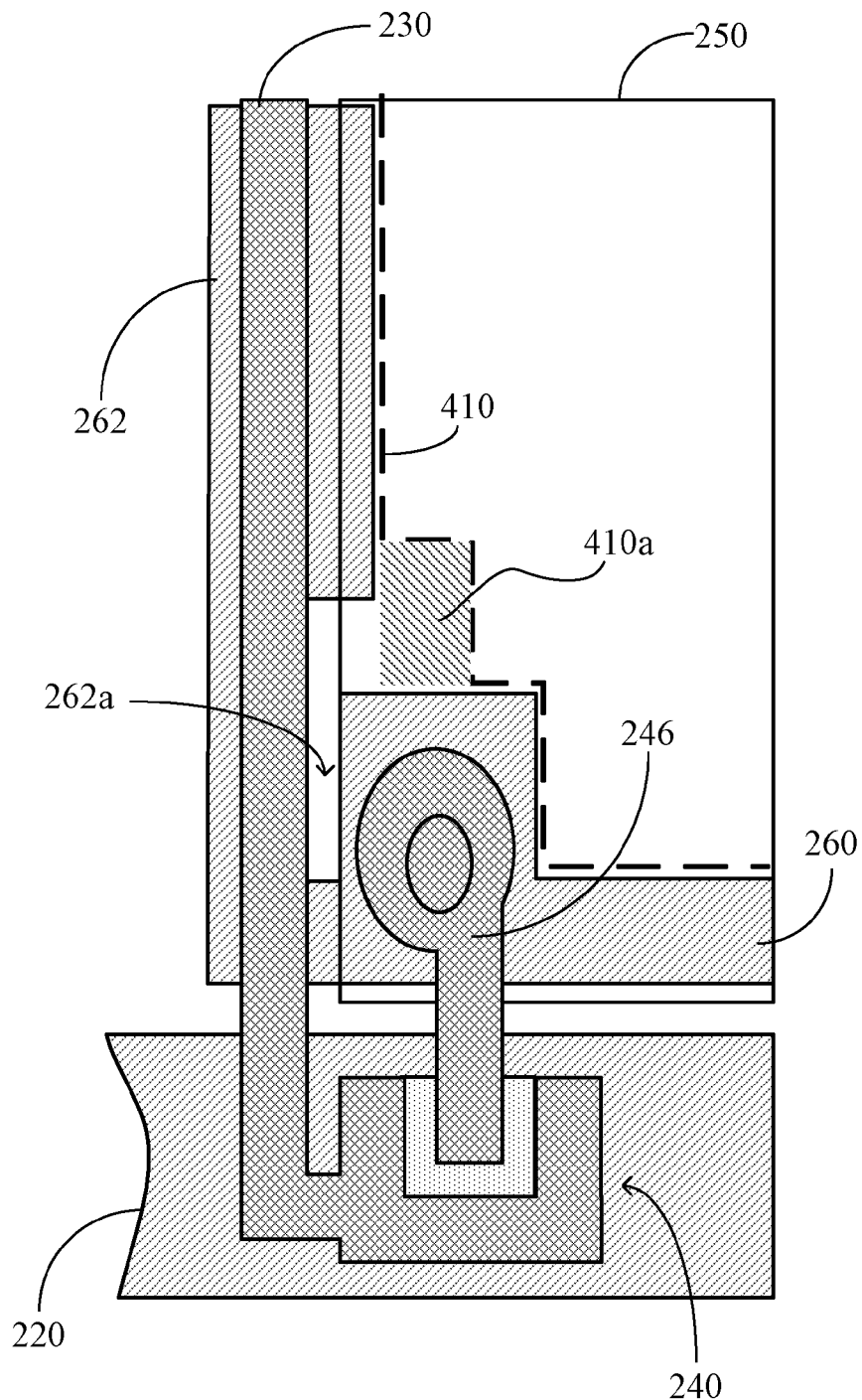
FIG. 4A is a schematic drawing illustrating a black matrix according to the preferred embodiment of the present invention.

FIG. 4A is a schematic drawing illustrating a black matrix according to the preferred embodiment of the present invention. Referring to FIG. 4A, the LCD panel 200 of the preferred embodiment further includes a liquid crystal layer with a predetermined thickness and an upper substrate (not shown for clarity). There is a black matrix on the upper substrate for covering the opaque metal lines, such as the scan lines 220, the signal lines 230, the TFTs 240 and the common lines 260, also exposing the transparent pixel electrodes 250 to increase a contrast of images. Because the gap 262a only has the above-mentioned isolation layer (transparent), some part light of the backlight leaks out via the gaps 262a and causes the low contrast of the images. Therefore, an additional covered area 410a should be extended from an edge of the covered area 410 (as shown by dashed lines) of the black matrix for covering the leak of the light passing through the liquid crystal layer from the gap 262a.

Figure 4B:
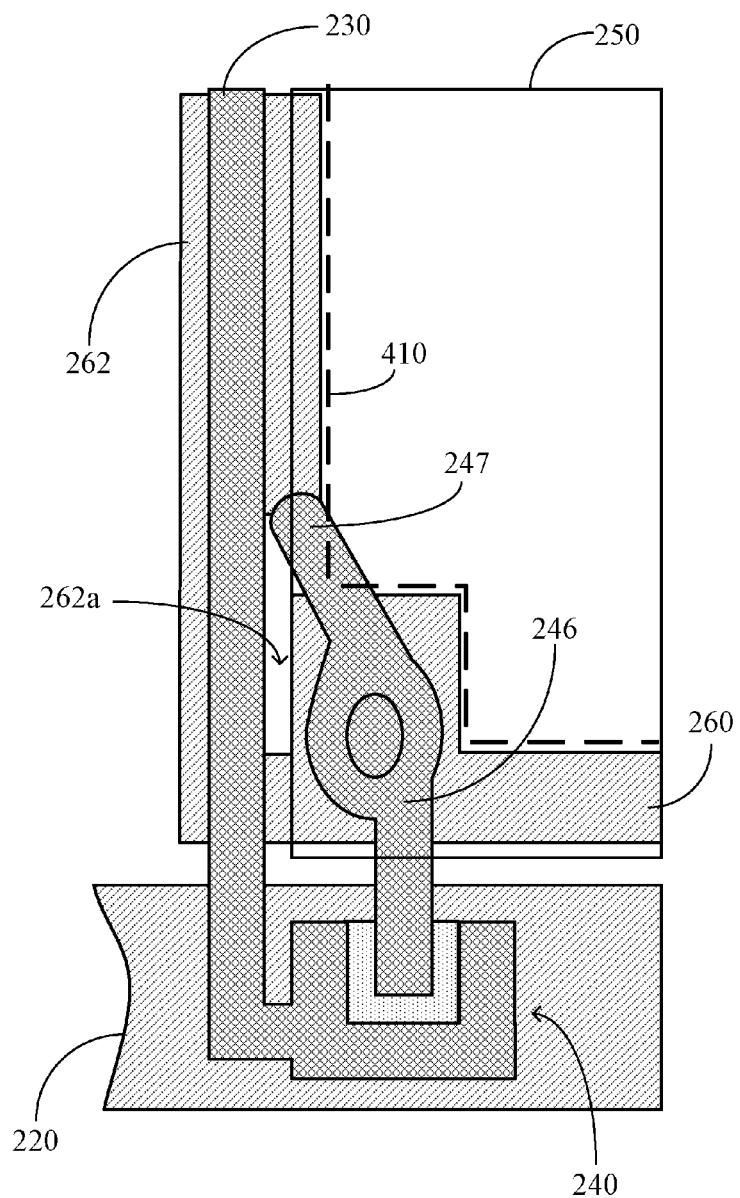
FIG. 4B is a top view schematically illustrating a repair structure of an LCD panel in another preferred embodiment of the present invention.

FIG. 4B is a top view schematically illustrating a repair structure of an LCD panel in another preferred embodiment of the present invention. Referring to FIG. 4B, in each said TFT 240, the other end of the drain electrode 246 further has an extension portion 247 to cover a part of the gap 262a. The extension portion 247 is designed to prevent part of the backlight leakage from the gap 262a, thereby decreasing the covered area of the black matrix of the upper substrate to increase the aperture ratio, in which the edge of the covered area 410 of the black matrix is shown as dashed lines.

As mentioned above, the gap is designed in the repair structure of the LCD panel in accordance with the present invention, and the gap is not covered by the pixel electrode, the branches of the common line, and the signal line. The common line can be cut via the gap without causing the short-circuit problem. Therefore, the drawback with respect to the repair of the high-aperture-ratio LCD panel is solved.

The repairing method of using the repair structure of the LCD panel 200 in the preferred embodiment of the present invention will be explained in detail in the following. Referring to FIG. 5, FIG. 5 is a schematic drawing illustrating the repairing method according to one preferred embodiment of the present invention. A location of a damaged signal line 230 can be obtained on the LCD panel 200 in the preferred embodiment of the present invention after an array detection stage. In the preferred embodiment, the repairing method is used when the damaged signal line 230 is shorted with the corresponding branch 262. The repairing method comprises a cutting process and a welding process.

According to a short spot 310 of the damaged signal line 230, the cutting process is cutting the corresponding common line 260 respectively from a first gap 262a (1) and a second gap 262a (2) which are adjacent to the branches 262 along the dotted lines. The first gap 262a (1) herein corresponds to the damaged signal line 230, and the first gap 262a (1) and the second gap 262a (2) are defined at both sides of the damaged signal line 230. The welding process is welding the TFT 240 (2) which corresponds to the second gap 262a (2) into the scan line 220.

More specifically, although a signal of the damaged signal line 230 can be shown on the pixel region 210a (1) of the corresponding first gap 262a (1), the signal can also be transmitted to the branches 262 so as to affect the common line 260. Thus, the common line 260 needs to be cut off respectively from the first gap 262a (1) and the second gap 262a (2) for disconnecting the signal from affecting the entire common line 260. In addition, the cutting process can be implemented via a laser cutting along the dotted lines.

On the other hand, the process of welding the TFT 240 (2) and the scan line 220 can be implemented by shorting a connection 320 between the TFT and the scan line of the drain electrode 246(2) on the scan line 220 which is disposed on the bottom layer. Accordingly, the driving signal of the scan line 220 can be transmitted to the pixel electrode 250(2), and the corresponding pixel region 210a (2) of the second gap 262a (2) forms a dark spot for repairing, thereby improving a visual effectiveness of the LCD panel. Similarly, the welding process can be implemented via a laser welding.

Figure 6:
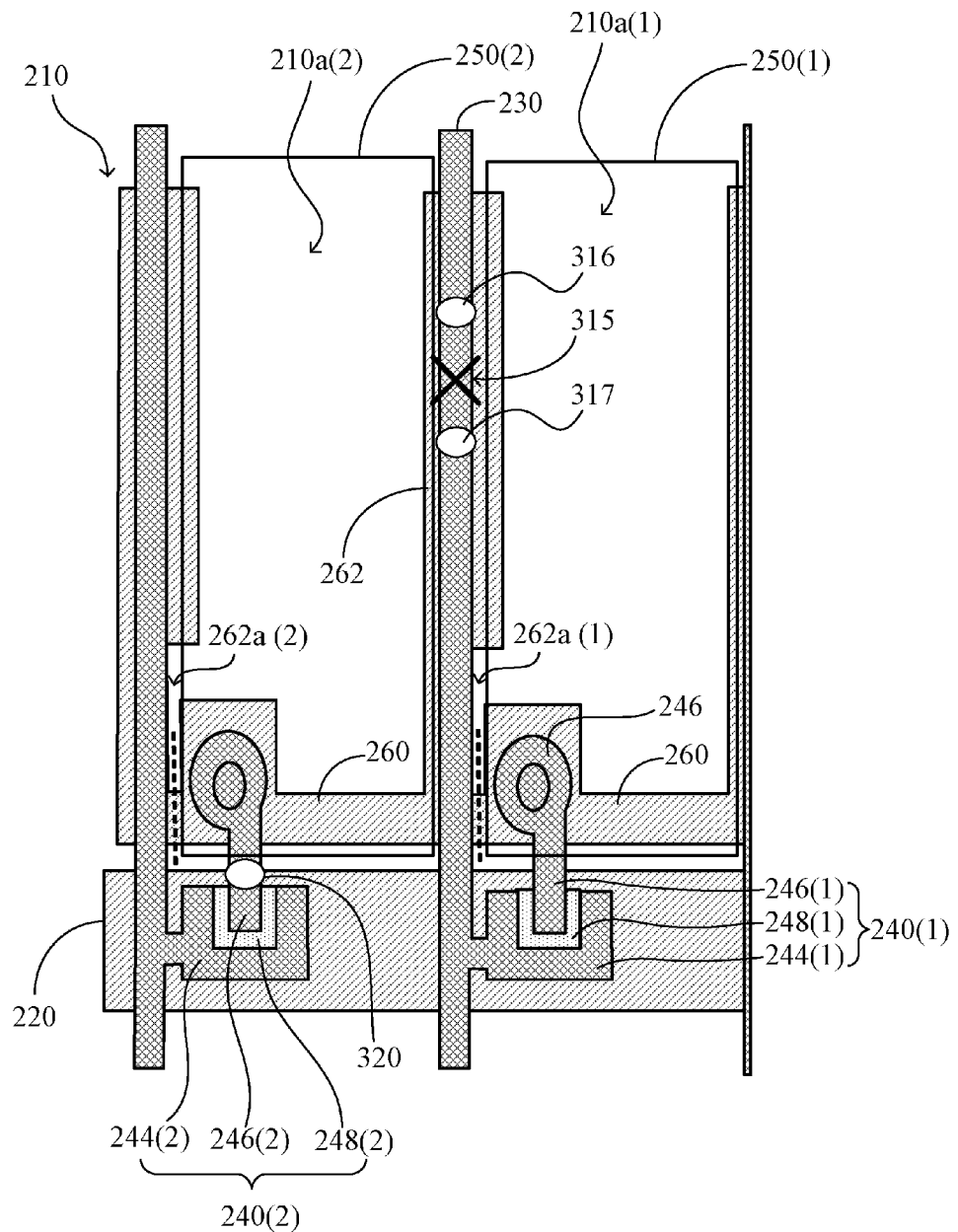
FIG. 6 is a schematic drawing illustrating the repairing method according to another preferred embodiment of the present invention.

Referring to FIG. 6, FIG. 6 is a schematic drawing illustrating the repairing method according to another preferred embodiment of the present invention. A location of a damaged signal line 230 can be obtained on the LCD panel 200 in the preferred embodiment of the present invention after an array detection stage. In the preferred embodiment, the repairing method is used when the damaged signal line 230 is an open-circuit. The repairing method comprises a cutting process and a welding process.

According to a broken spot 315 of the damaged signal line 230, the cutting process is cutting the corresponding common line 260 respectively from a first gap 262a (1) and a second gap 262a (2) which are adjacent to the branches 262 along the dotted lines. The first gap 262a (1) herein corresponds to the damaged signal line 230, and the first gap 262a (1) and the second gap 262a (2) which are defined at both sides of the damaged signal line 230. The welding process is welding two terminals of the broken spot 315 of the damaged signal line 230 onto the branches 262 (as shown at welding points 316 and 317) respectively and welding the TFT 240 (2) which corresponds to the second gap 262a (2) onto the scan line 220.

More specifically, the welding process is welding the damaged signal line 230 via the welding points 316 and 317 onto the branches 262, so that a signal of the damaged signal line 230 can be transmitted to the branches 262 via the welding point 316 and then transmitted to the original signal line 230 via the welding point 317 for repairing. Thus, the corresponding pixel region 210a (1) of the first gap 262a (1) can be shown properly. However, the signal will also affect the common line 260. Thus, the common line 260 needs to be cut off respectively via the first gap 262a (1) and the second gap 262a (2) for disconnecting the signal from affecting the entire common line 260. In addition, the welding process can be implemented via a laser welding, and the cutting process can be implemented via a laser cutting along the dotted lines.

Similarly, the process of welding the TFT 240 (2) and the scan line 220 can be implemented by shorting a connection between the TFT and the scan line 320 of the drain electrode 246 (2) onto the scan line 220 which is disposed on the bottom layer. Accordingly, the driving signal of the scan line 220 can be transmitted to the pixel electrode 250 (2) via the connection between the TFT and the scan line 320, and the corresponding pixel region 210a (2) of the second gap 262a (2)

forms a dark spot for repairing, thereby improving the visual effectiveness of the LCD panel.

As mentioned above, the repairing method in accordance with the present invention utilizes the gap which is arranged in the above-mentioned preferred embodiment. The gap is not covered by the pixel electrode, the branches of the common line and the signal line, so the common line can be cut off via the gap without causing the short-circuit problem. In addition, the method also utilizes the welding process to connect the TFT of the damaged signal line and the scan line for forming the dark spot, thereby reducing the effect of the LCD panel displaying quality. In accordance with the repairing method, the drawback that the LCD panel with the high-aperture-ratio pixel design can not be repaired causing the cost raise is solved.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A repair structure for a liquid crystal display panel, comprising:
    a substrate;
    a plurality of scan lines disposed on the substrate;
    a plurality of signal lines crossing without contacting the scan lines to define a plurality of pixel regions;
    a plurality of thin film transistors respectively disposed in the pixel regions, each of the thin film transistors being electrically coupled to a corresponding one of the scan lines and a corresponding one of the signal lines;
    a plurality of pixel electrodes respectively disposed in the pixel regions, each of the pixel electrodes being electrically coupled to a corresponding one of the thin film transistors; and
    a plurality of common lines parallel to and alternately disposed with the scan lines on the substrate, each of the common lines having a plurality of branches being parallel to the signal lines, and a plurality of gaps defined between a trunk of the common line and the branches;
    wherein the branches of each common line respectively overlap without contacting the signal lines, and wherein each branch, the corresponding signal line, and the pixel electrode are arranged so as to expose the corresponding gap;
    wherein each of the thin film transistors comprises a drain electrode, one end of the drain electrode is electrically coupled to the thin film transistor and the other end of the drain electrode is disposed on the common line and electrically coupled to the corresponding pixel electrode via a contact hole, and wherein the other end of the drain electrode has an extension portion for covering a part of the gap.

2. The repair structure of claim 1, wherein the drain electrodes and the signal lines are made of a same metal material.

3. The repair structure of claim 1, wherein the common lines and the scan lines are made of a same metal material.

4. The repair structure of claim 1, wherein the branches are respectively disposed below the signal lines.

5. A repairing method of a repair structure for a liquid crystal display panel, the repair structure comprising a substrate; a plurality of scan lines disposed on the substrate; a plurality of signal lines crossing without contacting the scan lines to define a plurality of pixel regions; a plurality of thin film transistors respectively disposed in the pixel regions, each of the thin film transistors being electrically coupled to a corresponding one of the scan lines and a corresponding one of the signal lines; a plurality of pixel electrodes respectively disposed in the pixel regions, each of the pixel electrodes being electrically coupled to a corresponding one of the thin film transistors; and a plurality of common lines parallel to and alternately disposed with the scan lines on the substrate, each of the common lines having a plurality of branches being parallel to the signal lines, and a plurality of gaps defined between a trunk of the common line and the branches; wherein the branches of each common line respectively overlap without contacting the signal lines, and wherein each branch, the corresponding signal line, and the pixel electrode are arranged so as to expose the corresponding gap, and when a damaged signal line is shorted with the corresponding branch, the method comprising:
    cutting the corresponding common line respectively from a first gap and a second gap adjacent to the corresponding branch, wherein the first gap corresponds to the damaged signal line, and the first gap and the second gap are defined at both sides of the damaged signal line; and
    welding the thin film transistor corresponding to the second gap onto the scan line.

6. The repairing method of claim 5, wherein the cutting process utilizes a laser to cut.

7. The repairing method of claim 5, wherein the welding process utilizes a laser to weld.

8. A repairing method of a repair structure for a liquid crystal display panel, the repair structure comprising a substrate; a plurality of scan lines disposed on the substrate; a plurality of signal lines crossing without contacting the scan lines to define a plurality of pixel regions; a plurality of thin film transistors respectively disposed in the pixel regions, each of the thin film transistors being electrically coupled to a corresponding one of the scan lines and a corresponding one of the signal lines; a plurality of pixel electrodes respectively disposed in the pixel regions, each of the pixel electrodes being electrically coupled to a corresponding one of the thin film transistors; and a plurality of common lines parallel to and alternately disposed with the scan lines on the substrate, each of the common lines having a plurality of branches being parallel to the signal lines, and a plurality of gaps defined between a trunk of the common line and the branches; wherein the branches of each common line respectively overlap without contacting the signal lines, and wherein each branch, the corresponding signal line, and the pixel electrode are arranged so as to expose the corresponding gap, and when a damaged signal line is an open-circuit, the method comprising:
    cutting the corresponding common line from a first gap and a second gap which are adjacent to the branch corresponding to the damaged signal line, wherein the first gap corresponds to the damaged signal line, and the first gap and the second gap are defined at both sides of the damaged signal line; and
    welding two terminals of a broken spot of the damaged signal line onto the branch respectively, and welding the thin film transistor corresponding to the second gap onto the scan line.

9. The repairing method of claim 8, wherein the cutting process utilizes a laser to cut.

10. The repairing method of claim 8, wherein the welding process utilizes a laser to weld.

* * * * *